United States Patent [19]
Song

[11] Patent Number: 5,860,301
[45] Date of Patent: Jan. 19, 1999

[54] CLOTHES WASHER HAVING A WATER SUPPLY APPARATUS

[75] Inventor: Won-Ji Song, Kwangju, Rep. of Korea

[73] Assignee: Daewoo Electronics Co., Ltd., Rep. of Korea

[21] Appl. No.: 925,058

[22] Filed: Sep. 8, 1997

[30] Foreign Application Priority Data

Sep. 30, 1996 [KR] Rep. of Korea ................. 1996 32352

[51] Int. Cl.⁶ ........................... D06F 39/02; D06F 39/08
[52] U.S. Cl. ............................................. 68/207; 68/17 R
[58] Field of Search .................................. 68/207, 17 R, 68/23.5

[56] References Cited

U.S. PATENT DOCUMENTS 5,579,656  12/1996  Shin ........................................ 68/17 R

FOREIGN PATENT DOCUMENTS

| 3129263 | 2/1983 | Germany ................................ 68/17 R |
| 10575 | 1/1979 | Japan ...................................... 68/17 R |
| 2 297 561 | 8/1996 | United Kingdom . |
| 2 310 674 | 9/1997 | United Kingdom . |

*Primary Examiner*—Philip R. Coe
*Attorney, Agent, or Firm*—Pillsbury Madison & Sutro,LLP

[57] ABSTRACT

A water supply apparatus 120 of a clothes washer is comprised of an extractable water supply guider 140 from a housing 121. In the initial state that the water inlet 146 is blocked by the plug 131, the pressure of the water is applied to the flange 142 so the water supply guider 140 extracts near the center of the clothes access opening 118. The water running through a water supply passage 141 drops into the clothes basket through a water outlet 143.

6 Claims, 3 Drawing Sheets

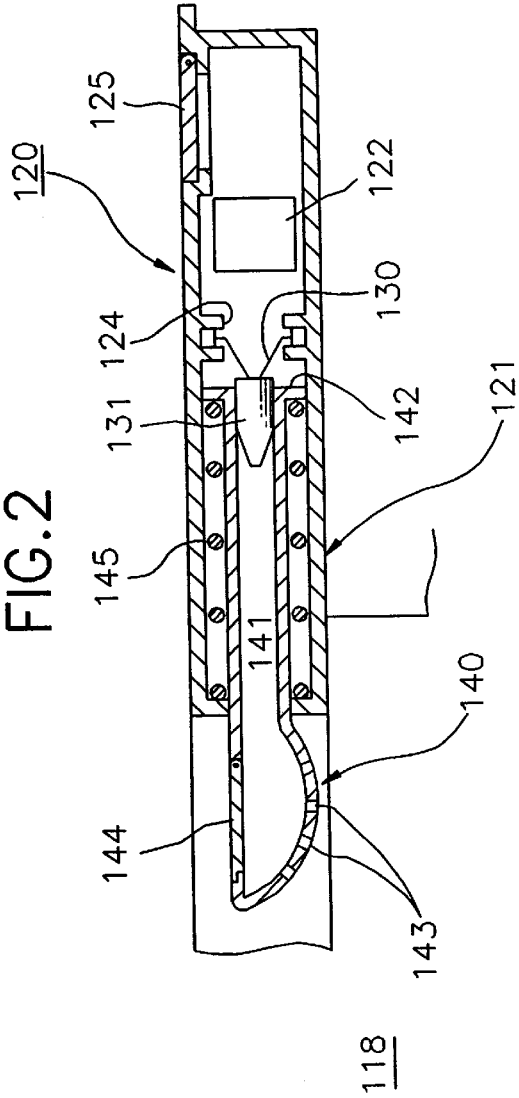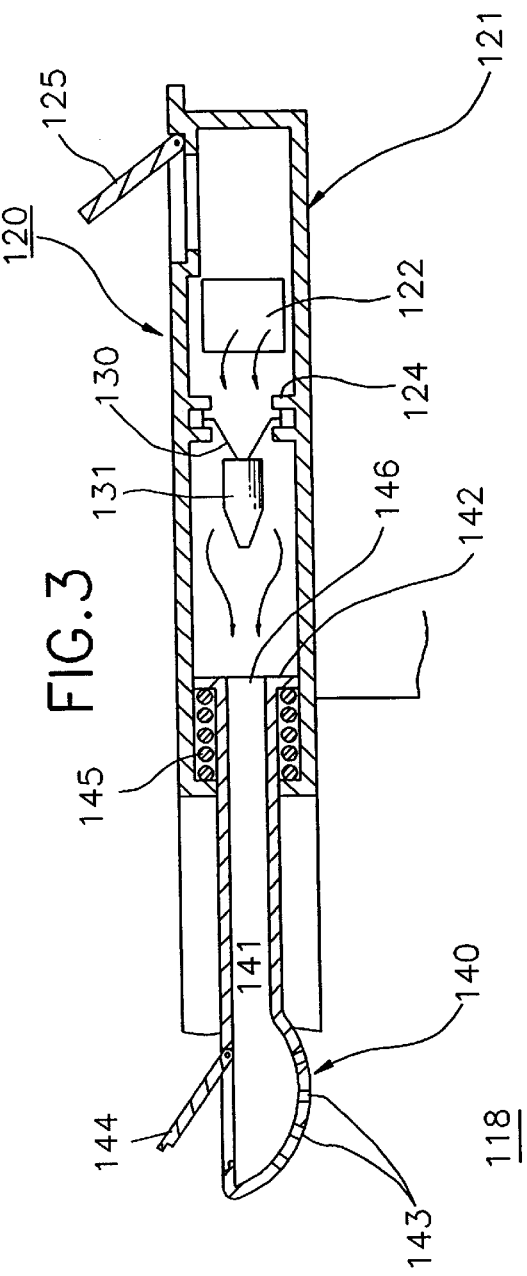

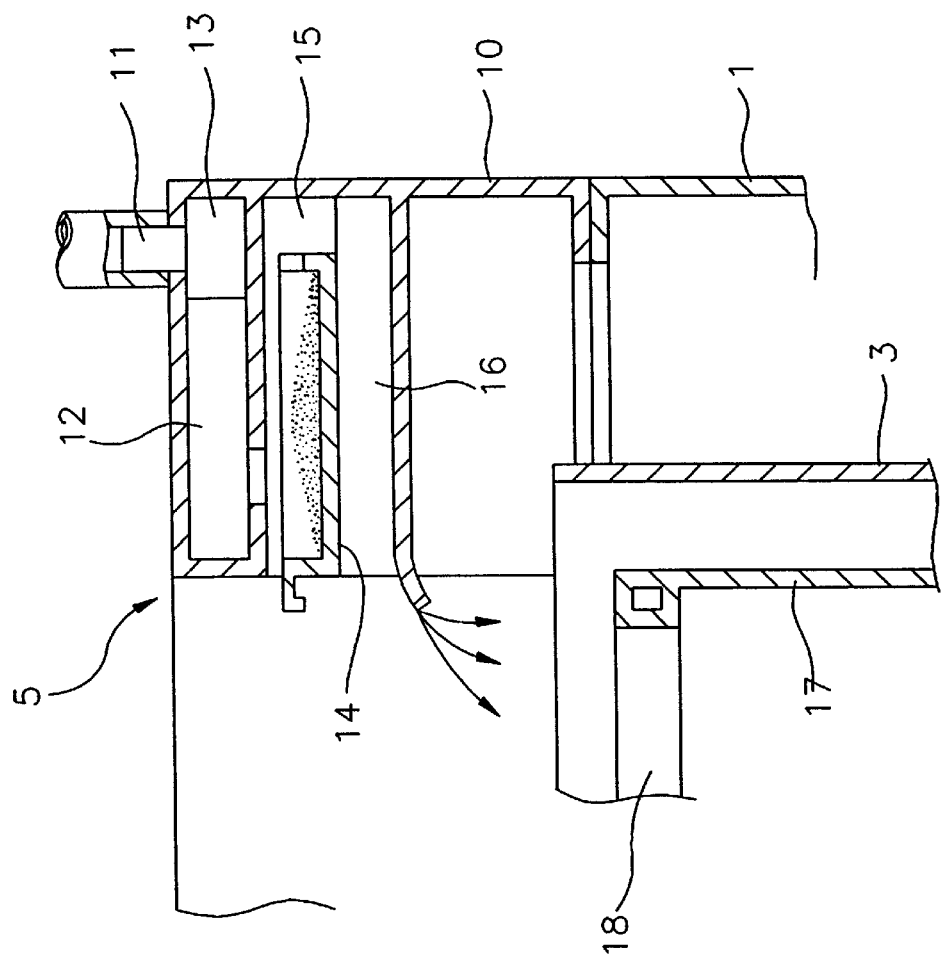

CLOTHES WASHER HAVING A WATER SUPPLY APPARATUS

BACKGROUND OF THE INVENTION

1. Field of the Invention

The present invention relates to a clothes washer, more particularly to a clothes washer having a water supply apparatus which is extracted by pressure of water toward a center of a water basket.

2. Description of the Prior Art

A clothes washer is generally comprised of a water basket containing water, a clothes basket rotatably provided in the water basket, and a pulsator vertically extended and rotatably provided in the center of the water basket. The clothes washer further is comprised of a water supply apparatus at the upper portion of a body of the washer.

FIG. 4 illustrates a clothes washer having a typical water supply apparatus. A water supply apparatus 5 is provided in a top cover 10 placed on a body 1 of the washer. Above the water supply apparatus 5 a water supply pipe 11 which is connected with a faucet (not shown) is provided for supplying fluid. At the exit of the water supply pipe 11 a water supply valve 13 is provided to selectively supply water flowing from the water supply pipe 11 to a water supply channel 12. Thereafter, the water contained in the water supply channel 12 drops into a detergent storage box 14 housed in a detergent accessing member 15. The powder or fluid detergent stored in the box 14 dissoves. The dissolved detergent flows into a clothes basket 17 through a discharge channel 16.

In a washer having a conventional water supply apparatus, a large-sized clothes access opening 18 is formed in order to conveniently put clothes into/from the clothes basket 17. Thus, for preventing obstruction of clothes access into/from the clothes basket 17, the water supply apparatus 5 must be arranged at the location above a water basket 3 provided at the outside of the clothes basket 17. Since the water supply apparatus 5 is placed at an outer area at a distance from a vertical wall of the clothes basket 17, there is likely drawback for water to drop at the outside circumference of the water basket 3. Moreover, in the case of the supply of the detergent dissolved water, the vicinity of the water basket 3 will be covered with grime. Further, the detergent dissolved water drops adjacent to the vertical wall of the clothes basket 17 and the detergent dissolved water is unevenly supplied only to the clothes adjacent to the circumference of the clothes basket 17 owing to the rotation of the pulsator.

SUMMARY OF THE INVENTION

Therefore, it is an object of the present invention to provide a clothes washer having a water supply apparatus for improving the washing efficiency of the washer.

It is another object of the present invention to provide a clothes washer having a water supply apparatus for sustaining cleanliness of a washer.

In order to achieve the above objects of the present invention, a clothes washer having a water supply apparatus comprises a body; a water basket housed in the body for containing water; a clothes basket disposed in the water basket; a top cover including an opening for allowing access of clothes from/into said clothes basket; and a water supply means installed in the top cover for being movable by the supplying water pressure.

Further, the water supply means is arranged to move toward a center of the opening.

Further, the water supply means can receive water from a water supply channel formed in the top cover, the supply channel is provided around a circumference of the clothes access opening.

Moreover, the water supply means is comprised of a housing intercommunicating with the water supply channel, and a water supply guider being movable in the housing, the water supply guider includes a passage which delivers water supplied through a water inlet intercommunicating with the water supply channel to a water outlet, the housing includes a plug being fittable into said water inlet of the water supply guider.

Further, the water pressure of the housing is applied perpendicularally to a flange formed around the water inlet of the water supply guider.

Further, the plug is attached to the housing with a net.

BRIEF DESCRIPTION OF THE DRAWINGS

The above objects and other advantages of the present invention will be more clarified by describing a preferred embodiment thereof with reference to the accompanying drawings in which:

FIG. 2 is a cross-sectional view taken along the line 2—2 of FIG. 1 in the water supply mode;

FIG. 3 is a cross-sectional view taken along the line 2—2 of FIG. 1 in the water non-supply mode; and FIG. 4 is a partial cut vertical view of the clothes washer having a water supply apparatus according to a prior art.

DESCRIPTION OF THE PREFERRED EMBODIMENT

Figure 1:
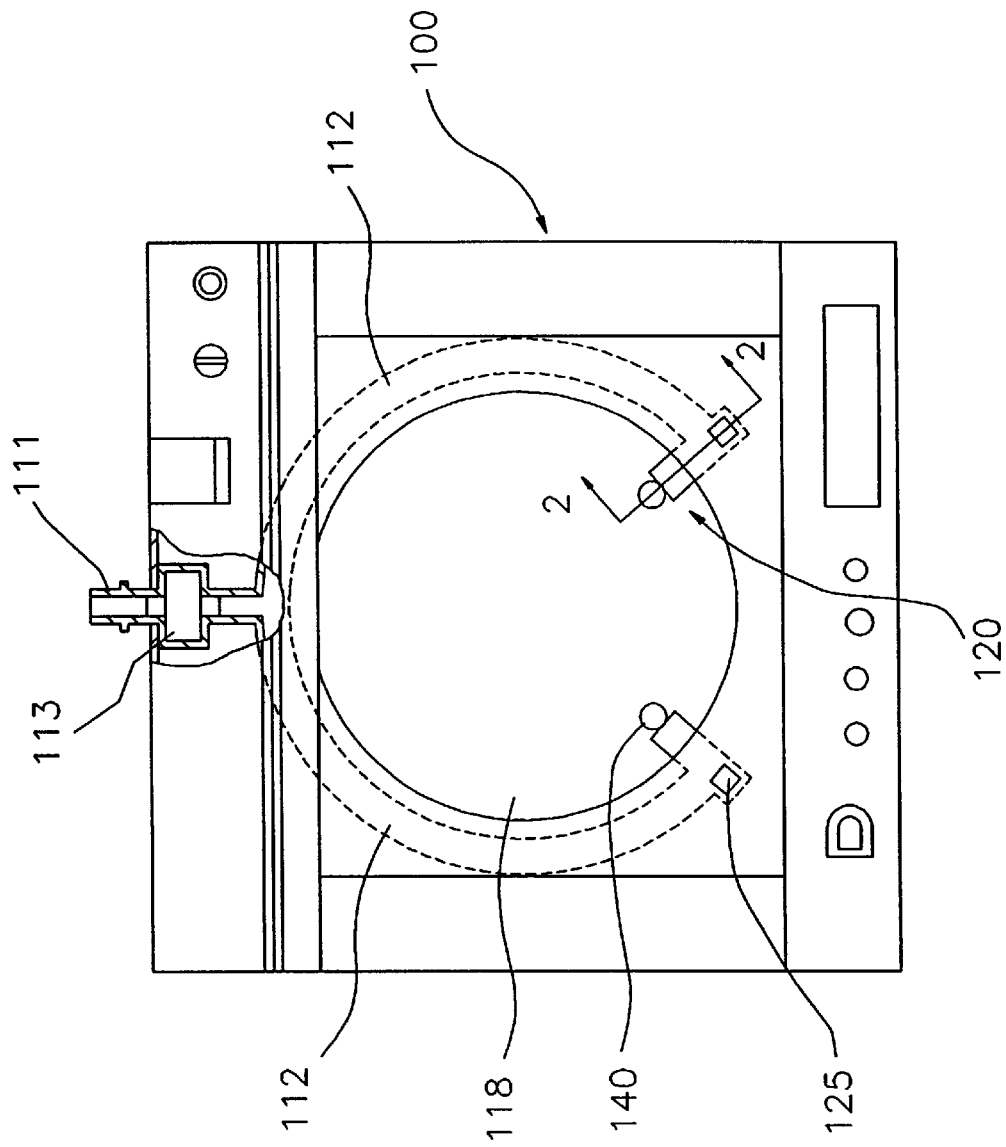
FIG. 1 is a plan view of a clothes washer having a water supply apparatus according to the present invention.

In the embodiment as shown in FIGS. 1, 2 and 3, a water supply pipe 111 connected with a faucet (not shown) is provided at a rear portion of a top cover 100 placed on a body (not shown). A water supply valve 113 is connected with the pipe 111 for supplying water during the water supply performance period. A water supply channel 112 is provided around a circumference of a clothes access opening 118 for delivering water via the water supply valve 113 to a water supply apparatus 120 provided at the front portion of the top cover 100.

In FIG. 2, the water supply apparatus 120 is comprised of a housing 121 for receiving water, and a water supply guider 140 being movable in the housing 121. The housing 121 is provided in a longitudinal manner in the top cover 100, being directed toward a center of the clothes access opening 118 (FIG. 1). At the side wall of the housing 121 a water supply opening 122 is provided for guiding the water contained in the water supply channel 112 into the housing 121. Further, a fixing member 124 is formed in the housing 121. The fixing member 124 holds a periphery of a ring shaped net 130 which filters any lumps of detergent, whereas an inner circumference of the ring shaped net 130 is attached on a plug 131 which blocks a water inlet 146 of a water supply guider 140 to be explained later.

The water supply guider 140 has a water supply passage 141 which is longitudinally extended in the water supply guider 140. At one end of the water supply guider 140 a flange 142 is formed that is concentrical to the water inlet 146. The flange 142 is arranged in a vertical direction of the water flow. At another end of the water supply guider 140 a plurality of water outlets 143 are provided for spraying water via the passage 141 to the clothes basket 17.

Numeral 125 is an opening for supplying detergent, and 145 is a spring for applying the expanding force to the flange 142 of the water supply guider 140 in the water non-supply mode. Further, numeral 144 is a cover for opening a blocked opening of a water outlet 143 that has occurred due to an insoluble detergent.

The clothes washer having the water supply apparatus according to the present invention constructed as above is operated as below.

Before the water supply mode starts, the detergent is poured into the housing 121 of the water supply apparatus 120 via the opening 125. Then clothes are put into the clothes basket 17 through the clothes access opening 118. While putting in the clothes the water supply apparatus 120 retracted to prevent any obstruction. Thereafter, as the water supply mode starts according to a predetermined program, the water supply valve 113 opens which allows the waiting water in the water supply pipe 111 to flow. The water flows through the water supply opening 112, and finally reaches the water supply apparatus 120.

The detergent deposited in the housing 121 is dissolved by the inflowing water. In the initial state of the water supply mode, the plug 131 blocks a water inlet 146 as shown in FIG. 2. As the water pressure in the housing 121 becomes higher, the pressure of water is applied on the flange 142, and the water supply guider 140 moves toward the center of the clothes access opening 118 as shown in FIG. 3. The water through the deplugged water inlet 146 flows along the water supply passage 141. While the detergent dissolved water of the housing 121 flows into the water inlet 146 of the water supply guider 140, any lumps of insoluble detergent are filtered by the net 130. Finally, the water drops onto the clothes basket 17 through a plurality of openings 143 of the extracted water supply guider 140.

Conversely, as the water supply mode is finished the water pressure applied to the flange 142 diminishes. The water supply guider 140 previously extracted from the housing 121 by the compressed spring 145 retracts into the housing 121 by the elastic force of the spring 145.

According to the present invention as described above, since the water supply guider is extracted adjacent to the center of the clothes basket when the water is supplied, the detergent dissolved water drops into the clothes basket, instead of outside the circumference of the clothes basket. Thus, the detergent dissolved water is supplied near the center of the clothes basket, and all detergent water can be utilized in the washing mode, thereby maintaining cleanliness of the washer and the high efficiency of the washer during use. Moreover, except for the water supply mode, the extractable water supply guider is removed from the clothes access opening, thereby obtaining convenient clothes access from/into the clothes basket.

What is claimed:

1. A clothes washer having a water supply apparatus comprising:

a body;

a water basket housed in said body for containing water;

a clothes basket disposed in said water basket;

a top cover including an opening for allowing access of clothes from/into said clothes basket; and a water supply means installed in said top cover for being movable by the supplying water pressure.

2. The clothes washer having a water supply apparatus according to claim 1, wherein said water supply means is arranged to move toward a center of said opening.

3. The clothes washer having a water supply apparatus according to claim 1, wherein said water supply means can receive water from a water supply channel formed in said top cover, said supply channel is provided around a circumference of said clothes access opening.

4. The clothes washer having a water supply apparatus according to claim 3, wherein said water supply means is comprised of a housing intercommunicating with said water supply channel, and a water supply guider being movable in said housing, said water supply guider includes a passage which delivers water supplied through a water inlet intercommunicating with said water supply channel to a water outlet, said housing includes a plug being fittable into said water inlet of the water supply guider.

5. The clothes washer having a water supply apparatus according to claim 4, wherein said water pressure of said housing is applied perpendicularally to a flange formed around said water inlet of the water supply guider.

6. The clothes washer having a water supply apparatus according to claim 4, wherein said plug is attached to said housing with a net.

* * * * *